(12) United States Patent
San Andres et al.

(10) Patent No.: US 8,914,247 B2
(45) Date of Patent: Dec. 16, 2014

(54) SYSTEMS AND METHODS TO MONITOR THE OPERATION OF A POWER GENERATION SYSTEM

(75) Inventors: Ramon Juan San Andres, Duluth, GA (US); Blaine Madison Mucklow, Atlanta, GA (US); Venu Madhav Tadepalli, Alpharetta, GA (US); Atul Nigam, Johns Creek, GA (US); Prashant Kumar Sharma, Cumming, GA (US); Robert Michael Lewkovich, Smyrna, GA (US); Shitanshu Srivastava, Smyrna, GA (US); Deepti Bhutani, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 760 days.

(21) Appl. No.: 13/195,311

(22) Filed: Aug. 1, 2011

(65) Prior Publication Data

US 2013/0035883 A1    Feb. 7, 2013

(51) Int. Cl.
  *G01R 31/00* (2006.01)
  *H02J 13/00* (2006.01)
(52) U.S. Cl.
  CPC ......... *H02J 13/0013* (2013.01); *Y02B 90/2607* (2013.01); *Y04S 10/525* (2013.01); *Y04S 40/12* (2013.01)
  USPC .......................................................... 702/59
(58) Field of Classification Search
  None
  See application file for complete search history.

(56) References Cited

U.S. PATENT DOCUMENTS

| | | | |
|---|---|---|---|
| 4,283,634 A | 8/1981 | Yannone et al. | |
| 5,125,738 A * | 6/1992 | Kawamura et al. | 356/44 |
| 6,499,114 B1 | 12/2002 | Almstead et al. | |
| 6,594,620 B1 | 7/2003 | Qin et al. | |
| 6,618,693 B2 | 9/2003 | Andrew et al. | |
| 6,691,118 B1 | 2/2004 | Gongwer et al. | |
| 6,823,675 B2 | 11/2004 | Brunell et al. | |
| 6,941,313 B2 | 9/2005 | Seliger et al. | |
| 6,993,556 B1 | 1/2006 | Seliger et al. | |
| 7,035,763 B2 | 4/2006 | Yuan et al. | |
| 7,432,686 B2 | 10/2008 | Erdman et al. | |
| 7,483,908 B2 | 1/2009 | Seliger et al. | |
| 7,966,381 B2 | 6/2011 | Fusari | |
| 8,022,708 B2 * | 9/2011 | Xie et al. | 324/501 |
| 2011/0029148 A1 * | 2/2011 | Yang et al. | 700/297 |

* cited by examiner

*Primary Examiner* — Aditya Bhat
(74) *Attorney, Agent, or Firm* — Armstrong Teasdale LLP

(57) ABSTRACT

A monitoring system is provided. The monitoring system includes at least one sensor that is configured to detect at least one fault within a power generation system. Moreover, the monitoring system includes a computing device that is coupled to the sensor. The computing device includes an interface that is configured to receive a signal representative of the fault. The computing device also includes a processor that is programmed to identify a location of the fault by considering a plurality of potential fault locations and the processor is programmed to determine at least one restoration solution to restore the fault by considering a plurality of potential restoration solutions.

17 Claims, 3 Drawing Sheets

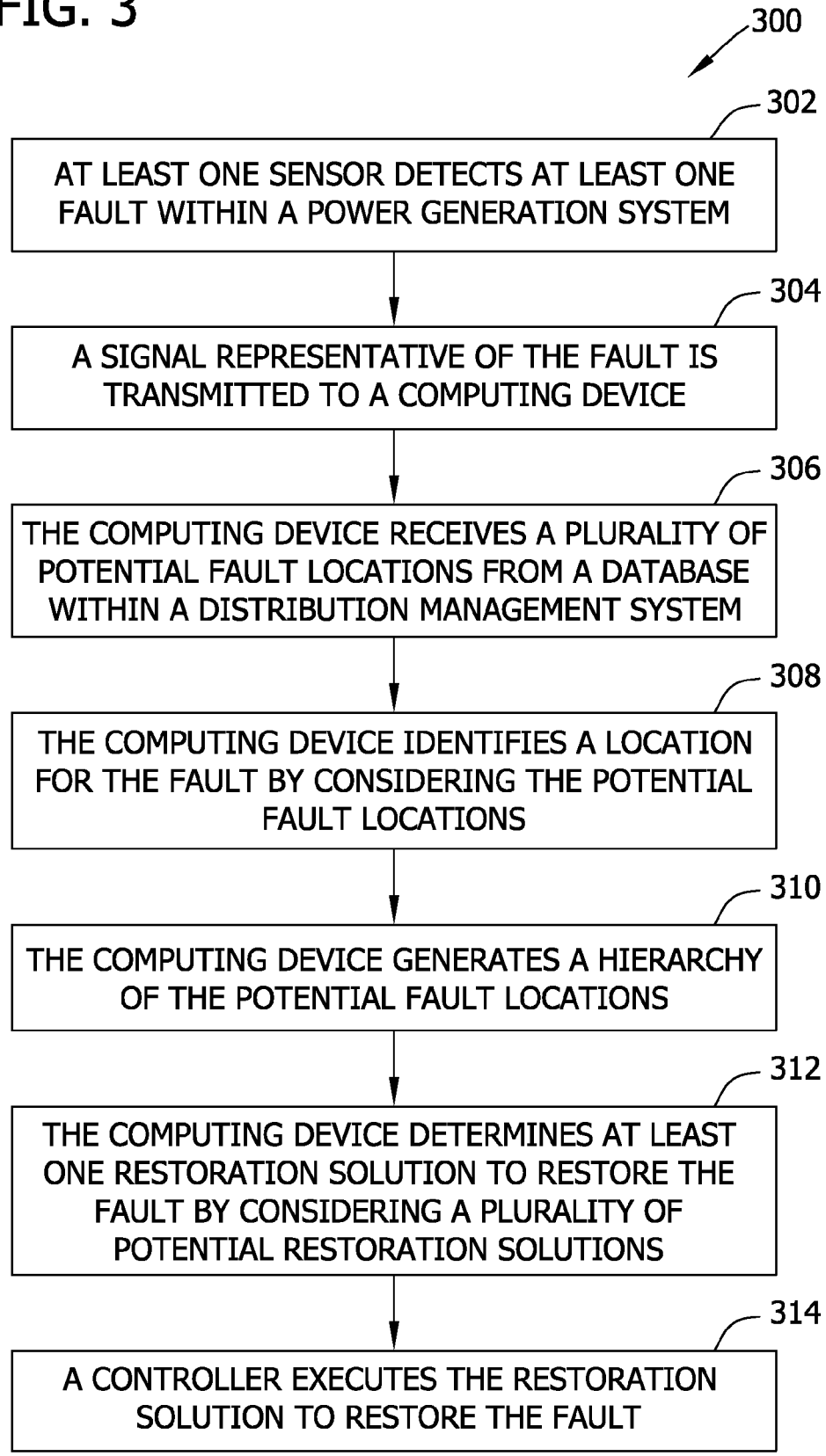

SYSTEMS AND METHODS TO MONITOR THE OPERATION OF A POWER GENERATION SYSTEM

BACKGROUND OF THE INVENTION

The field of the invention relates generally to power generation systems and, more particularly, to systems and methods to monitor the operation of power generation systems.

At least some known power generation systems include one or more components that may become damaged or that wear over time. For example, known power generation systems, such as known turbines, may include components such as, bearings, gears, and/or shafts that wear over time resulting in faults, such as a crack within the component, a disconnection of electrical wires, and/or a misalignment of the component. Continued operation with a worn component with a fault may cause additional damage to other components or may lead to a premature failure of the component or system. In addition, the components may endure damage as a result of a natural disaster. For example, a tree may fall on an electrical circuit and cause a fault to the circuit. Moreover, as a result of the fault, a circuit breaker protecting the electrical circuit may prevent the power generation system from operating until the circuit has been repaired.

To detect component damage within power generation systems and to provide an appropriate response solution, the operation of at least some known power generation systems are monitored with a monitoring system. For example, some monitoring systems include computing modules and/or devices that are able to detect the fault within the power generation system, determine the location of the fault within the power generation system, and restore the fault such that the power generation system may operate and function appropriately. However, such modules and/or devices may be limited as to the amount of information about the system they receive and/or use to determine the location of the fault. Accordingly, the precise fault location may not be readily determined and, as a result, the restoration of the power generation system may be delayed.

BRIEF DESCRIPTION OF THE INVENTION

In one embodiment, a monitoring system is provided. The monitoring system includes at least one sensor that is configured to detect at least one fault within a power generation system. Moreover, the monitoring system includes a computing device that is coupled to the sensor. The computing device includes an interface that is configured to receive a signal representative of the fault. The computing device also includes a processor that is programmed to identify a location of the fault by considering a plurality of potential fault locations and the processor is programmed to determine at least one restoration solution to restore the fault by considering a plurality of potential restoration solutions.

In another embodiment, a power generation system is provided. The power generation system includes at least one electrical circuit and a monitoring system that is coupled to the electrical circuit. The monitoring system includes at least one sensor that is configured to detect at least one fault within the electrical circuit. The monitoring system also includes a computing device that is coupled to the sensor. The computing device includes an interface that is configured to receive a signal representative of the fault. Moreover, the computing device includes a processor that is programmed to identify a location of the fault by considering a plurality of potential fault locations and the processor is programmed to determine at least one restoration solution to restore the fault by considering a plurality of potential restoration solutions.

In yet another embodiment, a method for use in monitoring the operation of a power generation system is provided. At least one fault within the power generation system is detected via at least one sensor and a signal representative of the fault is transmitted to a computing device. A location of the fault is identified, via the computing device, by considering a plurality of potential fault locations. Moreover, at least one restoration solution to restore the fault is determined, via the computing device, by considering a plurality of potential restoration solutions.

BRIEF DESCRIPTION OF THE DRAWINGS

FIG. 3 is a flow chart of an exemplary method that may be used for monitoring the operation of the power generation system shown in FIG. 1.

DETAILED DESCRIPTION OF THE INVENTION

The exemplary systems and methods described herein overcome at least some known disadvantages associated with at least some known power generation systems by providing a monitoring system that is able to accurately and efficiently monitor the operation of the power generation system when a fault within the system has occurred. More specifically, the monitoring system includes at least one sensor that is configured to detect at least one fault within a power generation system. Moreover, the monitoring system includes a computing device that is coupled to the sensor. The computing device includes an interface that is configured to receive a signal representative of the fault. The computing device also includes a processor that is programmed to identify a location of the fault by considering a plurality of potential fault locations and the processor is programmed to determine at least one restoration solution to restore the fault by considering a plurality of potential restoration solutions. By being able to utilize more information, such as the plurality of potential fault locations, the monitoring system is enabled to accurately identify the location of the fault and, as a result, the power generation system may readily be restored.

Figure 1:
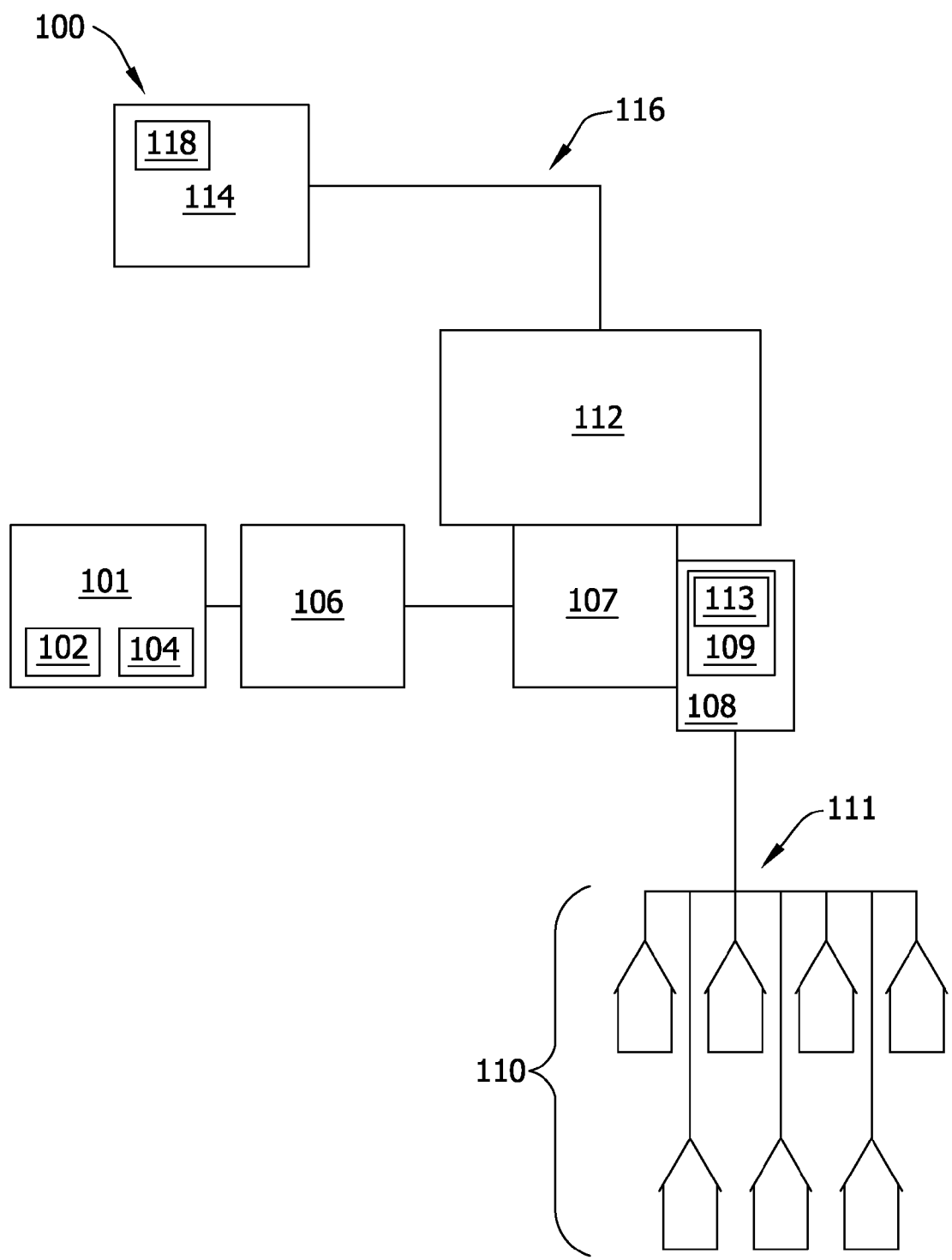
FIG. 1 is a block diagram of an exemplary power generation system.

FIG. 1 illustrates an exemplary power generation system 100 that includes a machine 101. In the exemplary embodiment, machine 101 is a variable speed machine, such as a wind turbine, a hydroelectric turbine, a gas turbine, and/or any other machine that operates with a variable speed. Alternatively, machine 101 may be a synchronous speed machine. In the exemplary embodiment, machine 101 includes a rotating device 102, such as a rotor or other device. Moreover, in the exemplary embodiment, rotating device 102 rotates a drive shaft 104 that is coupled to a generator 106. In the exemplary embodiment, generator 106 is a doubly-fed induction generator that is coupled to a power distribution system 107. Alternatively, generator 106 may be any other type of generator that is coupled to any electrical system that enables power generation system 100 to function as described herein.

In the exemplary embodiment, power distribution system 107 includes an output section 108 that includes at least one electrical circuit 109 for providing electrical power to a plurality of buildings 110, via a plurality of conduits 111. In the exemplary embodiment, conduits 111 are fabricated from a metallic wire. Alternatively, conduits 111 may be fabricated from any other substance or compound that enables power generation system 100 to function as described herein.

Moreover, in the exemplary embodiment, power generation system 100 includes a monitoring system 112 that is coupled to power distribution system 107. More specifically, in the exemplary embodiment, monitoring system 112 is coupled to electrical circuit 109 and is configured to detect at least one fault, such as fault 113, within system 100 and is configured to restore fault 113.

Monitoring system 112, in the exemplary embodiment, is also coupled to a distribution management system 114 via a network 116 such that monitoring system 112 is enabled to communicate with distribution management system 114. In the exemplary embodiment, network 116 may include, but is not limited to only including, the Internet, a local area network (LAN), a wide area network (WAN), a wireless LAN (WLAN), a mesh network, and/or a virtual private network (VPN). More specifically, in the exemplary embodiment, distribution management system 114 includes a database 118 that includes information about power generation system 100, such as a map that includes a location for machine 101 and other components of system 100 and/or potential fault locations within system 100. Moreover, in the exemplary embodiment, distribution management system 114 communicates information from database 118 to monitoring system 112 via network 116.

During operation, machine 101 generates mechanical rotational, energy via rotating device 102 and drives generator 106. Generator 106 supplies electrical power to power distribution system 107 and power is distributed to buildings 110. Moreover, in the exemplary embodiment, because of wear, damage, or vibration, for example, one or more components may have at least one fault, such as fault 113 within electrical circuit 109. Monitoring system 112 detects fault 113 and immediately discontinues electrical flow within power generation system 100. As a result, buildings 110 are unable to receive power.

Monitoring system 112 retrieves information about power generation system 100 from distribution management system 114 and is able to identify the location of fault 113 based on the information retrieved. Monitoring system 112 then determines at least one restoration solution to restore fault 113 by considering a plurality of potential restoration solutions. Monitoring system 112 then restores fault 113 and electrical flow is continued within power generation system 100. As such, buildings 110 are able to receive power again. By being able to utilize information received from distribution management system 114, monitoring system 112 is enabled to accurately identify the location of fault 113 and, as a result, electrical power within power generation system 100 may readily be restored.

Figure 2:
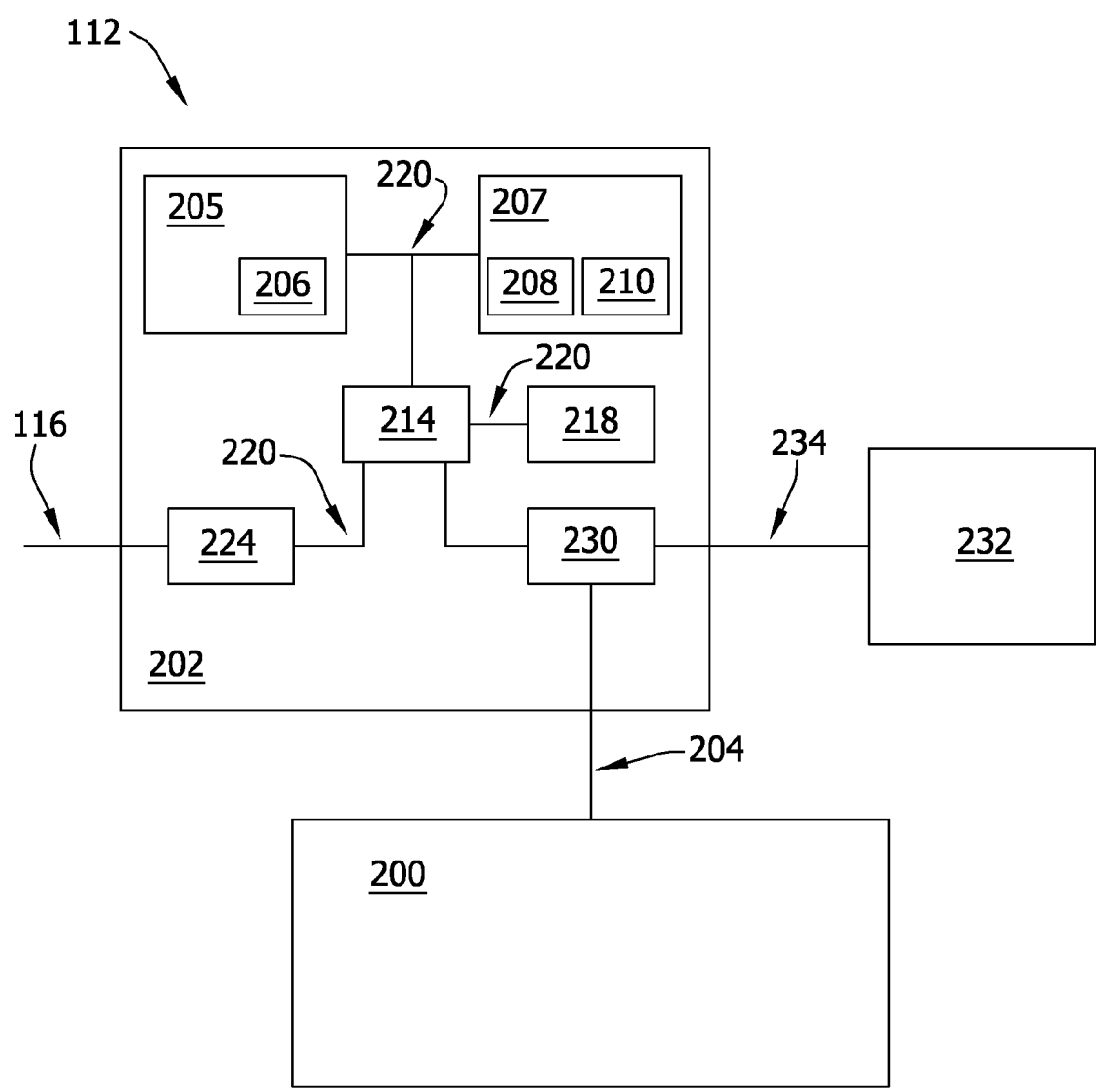
FIG. 2 is a block diagram of an exemplary monitoring system that may be used with the power generation system shown in FIG. 1.

FIG. 2 is a block diagram of monitoring system 112. In the exemplary embodiment, monitoring system 112 includes at least one sensor 200 that is coupled to power distribution system 107 (shown in FIG. 1). More specifically, in the exemplary embodiment, sensor 200 is coupled to electrical circuit 109 (shown in FIG. 1). Sensor 200, in the exemplary embodiment, is a circuit breaker, and is configured to detect at least one fault, such as fault 113 (shown in FIG. 1) within power generation system 100 (shown in FIG. 1). More specifically, in the exemplary embodiment, sensor 200 is configured to detect fault 113 within electrical circuit 109 and sensor 200 is configured to discontinue electrical flow within power generation system 100 when fault 113 is detected.

Monitoring system 112 also includes a computing device 202 that is coupled to sensor 200 via a conduit 204. In the exemplary embodiment, conduit 204 is fabricated from a metallic wire. Alternatively, conduit 204 may be fabricated from any other substance or compound that enables monitoring system 112 and/or power generation system 100 to function as described herein.

In the exemplary embodiment, computing device 202 includes a user interface 205 that receives at least one input from a user. In the exemplary embodiment, user interface 205 includes a keyboard 206 that enables a user to input pertinent information. Alternatively, user interface 205 may include, for example, a pointing device, a mouse, a stylus, a touch sensitive panel (e.g., a touch pad or a touch screen), a gyroscope, an accelerometer, a position detector, and/or an audio input interface (e.g., including a microphone).

Moreover, in the exemplary embodiment, computing device 202 includes a presentation interface 207 that presents information, such as input events and/or validation results, to the user. In the exemplary embodiment, presentation interface 207 includes a display adapter 208 that is coupled to at least one display device 210. More specifically, in the exemplary embodiment, display device 210 is a visual display device, such as a cathode ray tube (CRT), a liquid crystal display (LCD), an organic LED (OLED) display, and/or an "electronic ink" display. Alternatively, presentation interface 207 may include an audio output device (e.g., an audio adapter and/or a speaker) and/or a printer.

Computing device 202 also includes a processor 214 and a memory device 218. In the exemplary embodiment, processor 214 is coupled to user interface 205, presentation interface 207, and to memory device 218 via a system bus 220. In the exemplary embodiment, processor 214 communicates with the user, such as by prompting the user via presentation interface 207 and/or by receiving user inputs via user interface 205. Moreover, in the exemplary embodiment, processor 214 is programmed by encoding an operation using one or more executable instructions and providing the executable instructions in memory device 218. More specifically, in the exemplary embodiment, processor 214 is programmed to identify a location of at least one fault, such as fault 113, within power generation system 100. More specifically, processor 214 identifies the location by considering information, such as a plurality of potential fault locations within system 100, which is received from database 118 (shown in FIG. 1). Moreover, in the exemplary embodiment, processor 214 is programmed to determine at least one restoration solution to restore fault 113 by considering a plurality of potential restoration solutions. The plurality of potential restoration solutions may be predefined solutions programmed into processor and/or the plurality of potential restoration solutions may be inputs received by a user.

The term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, memory device 218 includes one or more devices that enable information, such as executable instructions and/or other data, to be stored and retrieved. Moreover, in the exemplary embodiment, memory device 218 includes one or more computer readable media, such as, without limitation, dynamic random access memory (DRAM), static random access memory (SRAM), a solid state disk, and/or a hard disk. In the exemplary embodiment, memory device 218 stores, without limitation, application source code, application object code, configuration data, additional input events, application states, assertion statements, validation results, and/or any other type of data. More specifically, in the exemplary embodiment, memory device 218 stores input data received by the user via user interface 205 and/or information received from other components of monitoring system 112 and/or power generation system 100.

Computing device 202 also includes a network interface 224 that couples to network 116 to facilitate communication with distribution management system 114 (shown in FIG. 1). In the exemplary embodiment, computing device 202 communicates with distribution management system 114 using a wireless communication means, such as radio frequency (RF), e.g., FM radio and/or digital audio broadcasting, an Institute of Electrical and Electronics Engineers (IEEE®) 802.11 standard (e.g., 802.11(g) or 802.11(n)), the Worldwide Interoperability for Microwave Access (WIMAX®) standard, a cellular phone technology (e.g., the Global Standard for Mobile communication (GSM)), a satellite communication link, and/or any other suitable communication means. WIMAX is a registered trademark of WiMax Forum, of Beaverton, Oreg. IEEE is a registered trademark of the Institute of Electrical and Electronics Engineers, Inc., of New York, N.Y. Alternatively, computing device 202 may communicate with distribution management system 114 using a wired network connection (e.g., Ethernet or an optical fiber).

Moreover, in the exemplary embodiment, computing device 202 includes a communication interface 230 that is coupled to processor 214 via system bus 220. Further, in the exemplary embodiment, communication interface 230 is coupled to sensor 200 via conduit 204. Monitoring system 112 also includes a controller 232 that is coupled to computing device 202 via a conduit 234.

Controller 232, in the exemplary embodiment, is also coupled to power distribution system 107. More specifically, in the exemplary embodiment, controller 232 is configured to receive at least one signal representative of at least one restoration solution to restore at least one fault, such as fault 113, from computing device 202. Controller 232 is further configured to execute the restoration solution to restore fault 113 by transmitting at least one signal representative of control parameters to control valves, switches, and/or gauges (not shown) within power distribution system 107 and/or power generation system 100.

During operation, because of wear, damage, or vibration, for example, one or more components within power generation system 100 may have at least one fault, such as fault 113, within electrical circuit 109. Monitoring system 112 detects fault 113 and immediately discontinues electrical flow within power generation system 100. As a result, buildings 110 (shown in FIG. 1) are unable to receive power. More specifically, in the exemplary embodiment, sensor 200 detects fault 113 within electrical circuit 109 and immediately discontinues electrical flow within power generation system 100 by transmitting a signal representative of a control parameter to an on/off switch and/or valve (not shown) within power distribution system 107. Sensor 200 also transmits a signal representative of fault 113 being detected to computing device 202 and computing device 202 is able to receive the signal via communication interface 230. Communication interface 230 transmits the signal to processor 214.

Processor 214 transmits a signal via network 116 to distribution management system 114. In the exemplary embodiment, distribution management system 114 transmits information from database 118 to computing device 202 via network 116. More specifically, processor 214 receives information about various locations of components within power generation system 100 and a plurality of potential fault locations within system 100. When processor 214 receives the information, processor 214 identifies the location of fault 113 by considering the potential fault locations. More specifically, in the exemplary embodiment, processor 214 generates a hierarchy of the potential fault locations, wherein the most likely location for fault 113 will be a first tier in the hierarchy and the least likely location for fault 113 will be a last tier in the hierarchy.

Processor 214 further identifies at least one restoration solution to restore fault 113 by considering a plurality of potential restoration solutions. More specifically, in the exemplary embodiment, processor 214 identifies a first restoration solution, a second restoration solution, and a third restoration solution. Each restoration solution is presented to a user, via presentation interface 207. The user may input his or her choice for the restoration solution to be executed and/or processor 214 may generate the restoration solution to be executed for restoring fault 113. Alternatively, each restoration solution may be executed such that the execution of restoration solution occurs at different time intervals. For example, the first restoration solution may be executed to restore fault 113 such that twenty percent of buildings 110 may receive power. Then the second restoration solution may be executed to restore fault 113 such that another forty percent of buildings 110 may receive power at a different time than the first restoration solution. Finally, the third restoration solution may be executed to restore fault 113 such that the remaining sixty percent of buildings 110 may receive power at a different time than the first and second restoration solutions.

Monitoring system 112 then restores fault 113 and electrical flow is continued within power generation system 100 such that buildings 110 are able to receive power again. More specifically, processor 214 transmits a signal representative of the restoration solution to controller 232. When controller 232 receives the signal, controller 232 executes the restoration solution to restore fault 113 by transmitting at least one signal representative of control parameters to control valves, switches, and/or gauges (not shown) within power distribution system 107 such that fault 113 is restored and buildings 110 are able to receive power again. Alternatively, when the user is presented with the restoration solutions, via presentation interface 207, the user may manually restore the faults without the use of controller 232.

FIG. 3 is a flow chart of a method 300 that may be used for monitoring the operation of a power generation system, such as power generation system 100 (shown in FIG. 1), by using a monitoring system, such as monitoring system 112 (shown in FIGS. 1 and 2). In the exemplary embodiment, at least one sensor 200 (shown in FIG. 2) detects 302 at least one fault, such as fault 113 (shown in FIG. 1), within power generation system 100. A signal representative of fault 113 is transmitted 304 to a computing device 202 (shown in FIG. 2). Computing device 202 receives 306 a plurality of potential fault locations from a database 118 (shown in FIG. 1) within a distribution management system 114 (shown in FIG. 1).

Computing device 202 then identifies 308 a location for fault 113 by considering the potential fault locations. More specifically, computing device 202 identifies 308 a location for fault 113 by generating 310 a hierarchy of the potential fault locations. Computing device 202 determines 312 at least one restoration solution to restore the fault by considering a plurality of potential restoration solutions. A controller 232 (shown in FIG. 2) executes 314 the restoration solution to restore the fault.

As compared to known power generation systems, the above-described embodiments enable faults within power generation systems to be monitored and restored in a more accurate and efficient manner. More specifically, the embodiments described herein include a monitoring system that may be used with a power generation system, wherein the monitoring system includes at least one sensor that is configured to detect at least one fault within a power generation system. Moreover, the monitoring system includes a computing device that is coupled to the sensor. The computing device includes an interface that is configured to receive a signal representative of the fault. The computing device also includes a processor that is programmed to identify a location of the fault by considering a plurality of potential fault locations and the processor is programmed to determine at least one restoration solution to restore the fault by considering a plurality of potential restoration solutions. By being able to utilize more information, such as the plurality of potential fault locations, the monitoring system is enabled to accurately identify the location of the fault and, as a result, the power generation system may readily be restored.

A technical effect of the systems and methods described herein includes at least one of (a) detecting, via at least one sensor, at least one fault within a power generation system; (b) transmitting a signal representative of at least one fault to a computing device; (c) identifying, via a computing device, a location of at least one fault by considering a plurality of potential fault locations; and (d) determining, via a computing device, at least one restoration solution to restore at least one fault by considering a plurality of potential restoration solutions.

Exemplary embodiments of the systems and methods for use in monitoring the operation of a power generation system are described above in detail. The systems and methods are not limited to the specific embodiments described herein, but rather, components of each system and/or steps of each method may be utilized independently and separately from other components and/or steps described herein. For example, each system may also be used in combination with other systems and methods, and is not limited to practice with only systems as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A monitoring system comprising:
   at least one sensor configured to detect at least one fault within a power generation system; and
   a computing device coupled to said at least one sensor, said computing device comprising:
   an interface configured to receive a signal representative of the at least one fault; and
   a processor programmed to:
   generate a hierarchy of a plurality of potential fault locations;
   identify a location of the at least one fault by considering the hierarchy, wherein the most likely location for the at least one fault will be a first tier in the hierarchy, and wherein the least likely location for the at least one fault will be at least a second tier in the hierarchy; and
   determine at least one restoration solution plan to restore the at least one fault by considering a plurality of potential restoration solutions.

2. A monitoring system in accordance with claim 1, wherein said at least one sensor is further configured to discontinue electrical flow within the power generation system when the at least one fault is detected.

3. A monitoring system in accordance with claim 1, further comprising a controller coupled to said computing device and configured to execute the at least one restoration solution plan to restore the at least one fault.

4. A monitoring system in accordance with claim 1, wherein the at least one restoration solution plan to restore the at least one fault includes a first restoration solution, a second restoration solution, and a third restoration solution.

5. A monitoring system in accordance with claim 4, further comprising a controller coupled to said computing device and configured to:
   execute the first restoration solution;
   determine whether the first restoration solution resolved the at least one fault;
   execute the second restoration solution if the first restoration solution did not resolve the at least one fault;
   determine whether the second restoration solution resolved the at least one fault; and
   execute the third restoration solution if the second restoration solution did not resolve the fault.

6. A monitoring system in accordance with claim 1, wherein said computing device further comprises a network interface coupled to a network such that said computing device is enabled to receive the plurality of potential fault locations from a database.

7. A power generation system comprising:
   at least one electrical circuit; and
   a monitoring system coupled to said at least one electrical circuit, said monitoring system comprising:
   at least one sensor configured to detect at least one fault within the at least one electrical circuit; and
   a computing device coupled to said at least one sensor, said computing device comprising:
   an interface configured to receive a signal representative of the at least one fault; and
   a processor programmed to:
   generate a hierarchy of a plurality of potential fault locations;
   identify a location of the at least one fault by considering the hierarchy, wherein the most likely location for the at least one fault will be a first tier in the hierarchy, and wherein the least likely location for the at least one fault will be at least a second tier in the hierarchy; and
   determine at least one restoration solution plan to restore the at least one fault by considering a plurality of potential restoration solutions.

8. A power generation system in accordance with claim 7, wherein said at least one sensor is further configured to discontinue electrical flow within said power generation system when the at least one fault is detected.

9. A power generation system in accordance with claim 7, wherein said monitoring system further comprises a controller coupled to said computing device and configured to execute the at least one restoration solution plan to restore the at least one fault.

10. A power generation system in accordance with claim 7, wherein the at least one restoration solution plan to restore the at least one fault includes a first restoration solution, a second restoration solution, and a third restoration solution.

11. A power generation system in accordance with claim 10, wherein said monitoring system further comprises a controller coupled to said computing device and configured to:
    execute the first restoration solution;
    determine whether the first restoration solution resolved the at least one fault;
    execute the second restoration solution if the first restoration solution did not resolve the fault;
    determine whether the second restoration solution resolved the at least one fault; and
    execute the third restoration solution if the first restoration solution did not resolve the fault.

12. A power generation system in accordance with claim 7, wherein said computing device further comprises a network interface coupled to a network such that said computing device is enabled to receive the plurality of potential fault locations from a database.

13. A method of monitoring the operation of a power generation system, said method comprising:
    detecting, via at least one sensor, at least one fault within the power generation system;
    transmitting a signal representative of the at least one fault to a computing device
    generating a hierarchy of a plurality of potential fault locations;
    identifying, via the computing device, a location of the at least one fault by considering the hierarchy, wherein the most likely location for the at least one fault will be a first tier in the hierarchy, and wherein the least likely location for the at least one fault will be at least a second tier in the hierarchy; and
    determining, via the computing device, at least one restoration solution plan to restore the at least one fault by considering a plurality of potential restoration solutions.

14. A method in accordance with claim 13, further comprising executing the at least one restoration solution plan, via a controller, to restore the at least one fault.

15. A method in accordance with claim 13, wherein determining, via the computing device, at least one restoration solution plan to restore the at least one fault further comprises determining, via the computing device, a first restoration solution, a second restoration solution, and a third restoration solution to restore the at least one fault.

16. A method in accordance with claim 15, further comprising;
    executing, via a controller, the first restoration solution;
    determining whether the first restoration solution resolved the at least one fault;
    executing the second restoration solution if the first restoration solution did not resolve the at least one fault;
    determining whether the second restoration solution resolved the at least one fault; and
    executing the third restoration solution if the first restoration solution did not resolve the at least one fault.

17. A method in accordance with claim 13, further comprising receiving, via the computing device, the plurality of potential fault locations from a database.

* * * * *